United States Patent
Kishida et al.

[11] Patent Number: 6,112,001
[45] Date of Patent: Aug. 29, 2000

[54] OPTICAL COUPLER AND A METHOD OF PRODUCING IT

[75] Inventors: Yuji Kishida; Ryuji Komeda; Yutaka Kuba; Takahiro Matsubara, all of Soraku-gun, Japan

[73] Assignee: Kyocera Corporation, Kyoto, Japan

[21] Appl. No.: 09/124,403

[22] Filed: Jul. 29, 1998

[30] Foreign Application Priority Data

Jul. 30, 1997 [JP] Japan .................................. 9-205018

[51] Int. Cl.[7] .................................................. G02B 6/30
[52] U.S. Cl. ........................ 385/49; 385/88; 385/147
[58] Field of Search .............................. 385/49, 88–94, 385/31, 147

[56] References Cited

U.S. PATENT DOCUMENTS

| | | | |
|---|---|---|---|
| 4,892,377 | 1/1990 | Randle | 385/39 |
| 5,321,786 | 6/1994 | Valette et al. | 385/92 |

FOREIGN PATENT DOCUMENTS 0588675  3/1994  European Pat. Off. .

OTHER PUBLICATIONS

Wale, et al. "Self–Aligned Flip–Chip Assembly of Photonic Devices with Electrical and Optical Connections," IEEE Transactions on Components, Hybrids, and Manufacturing Technology, vol. 13, No. 4, Dec. 1990, pp. 780–786.

*Primary Examiner*—Phan T. H. Palmer
*Attorney, Agent, or Firm*—Hogan & Hartson, LLP

[57] ABSTRACT

An optical coupler wherein on one principal face of an Si single crystal substrate are formed, by etching, grooves for mounting optical fibers and a portion for mounting an optical element that is divided into plural parts, a base substrate, of which coefficient of thermal expansion is substantially identical to that of the optical element, is bonded onto the other principal face of the substrate, and the optical element is mounted on the portion for mounting an optical element.

9 Claims, 5 Drawing Sheets

Prior Art

OPTICAL COUPLER AND A METHOD OF PRODUCING IT

FIELD OF THE INVENTION

The present invention relates to an optical coupler, that is used in optical communication systems based on optical fiber, optical information processing systems such as optical computers, etc., and a method of producing thereof.

PRIOR ART

Figure 7:
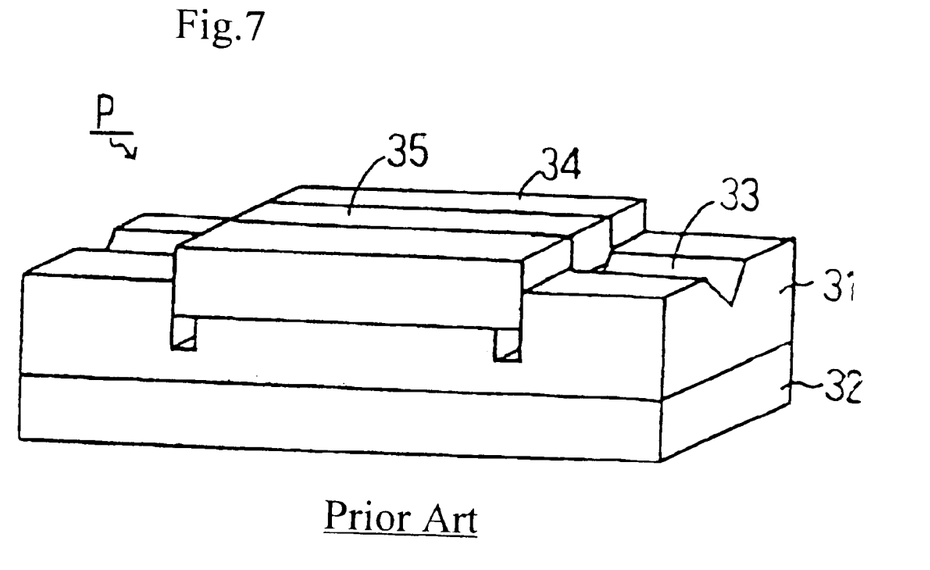
FIG. 7 is a perspective view of a conventional optical coupler P.

FIG. 7 is a perspective view showing a conventional optical coupler P wherein an LN optical waveguide element 34, that is made of a single crystal of lithium niobate (LN: LiNbO3), is mounted as an optical element. In the LN optical waveguide element 34, for example, an optical waveguide 35 is formed on the surface of an LN substrate, and the refractive index of the optical waveguide 35 is higher than that of LN, or in addition to it, an electric field, magnetic field, sound or the like is applied to the optical waveguide 35 to modulate the optical output strength, the direction of deflection of light, the polarization of light or the like.

This optical coupler P is structured by mounting and fixing a substrate for mounting an optical element 31, the substrate 31 being made of Si, etc., on a base substrate 32, and forming V-grooves 33 for mounting optical fiber on both ends of the substrate for mounting the optical element 31. The substrate for mounting the optical element 31 is machined with precision so that, when optical fibers are mounted in the V-grooves 33, the positions of the cores of the optical fibers are aligned with the positions of the core of the optical waveguide 35 of the LN optical waveguide element 34. It does not matter if the V-groove 33 is provided on only one end of the substrate for mounting the optical element In recent years, in the field of wire communication, to achieve a greater capacity of communication, the optical fiber communication system has been put to practical use mainly for transmission lines that are called the transit systems. Such transit systems comprise trunk transmission systems and access systems that connect local stations. Optical fiber communication is not limited to the transit systems. It is now being introduced into the subscriber's lines that connect offices and households with local stations. Moreover, the application of optical fiber communication is expanding to other fields such as local area network (LAN) and CATV (community antenna television, cable TV).

It is strongly desired to achieve a higher performance and reduce the cost of the optical couplers that are used in this optical fiber communication technology. To this end, it is promising to use integrated optical waveguide elements (optical circuit elements).

However, optical connection between an integrated optical waveguide element and an optical fiber requires precise alignment, that took much time and was a cause of an increased cost in the past.

The prior art for connecting an optical waveguide element and an optical fiber is as follows:

A light beam is guided through an optical waveguide. An optical fiber is connected to the light beam emergence end of the optical waveguide, and the light emerging from the optical fiber is monitored by a light receptor. The position of the optical fiber is adjusted fine to maximize the amount of light guided. This method of optical connection between an optical fiber and an optical waveguide is called the active alignment method. This method, however, requires transmission of light beam through the light waveguide and subsequent adjustment, and in turn, much time for optical axis alignment of every optical waveguide element, and is costly.

As a result, the following passive alignment method has been proposed as a method that improves the complexity of optical axis alignment of the above-mentioned active alignment method.

According to this method, a substrate and an optical waveguide element are fabricated with high precision in advance so that optical fibers can have optical connection with the optical waveguide element that is mounted on the substrate when the optical fibers are just mounted in V-grooves or the like on the surface of the substrate. As a specific example, a method has been proposed wherein electrode pads for solder bonding are formed on an optical waveguide element and a substrate of Si, etc. for mounting the element, and the optical waveguide is positioned relative to the V-grooves in the substrate and the optical waveguide element and the substrate are boned together by using the self-alignment effect of the solders built on the electrode pads, then, optical fibers are mounted and fixed in the V-grooves (U.S. Pat. No. 4,892,377).

This method allows simple optical connection and is suited to production in large quantities. However, as precision and reproducibility of positioning by the self-alignment effect of solder are not sufficient, this method has not been put to practical use yet. Another problem of this method is that, when the optical waveguide element and the substrate differ in coefficient of thermal expansion, the solder joints will be subjected to large stresses due to high temperature at the time of solder reflow and due to changes in environmental temperature at the time of use; as a result, the joints tend to fail at a higher rate, and pose the problem of reliability.

There is another method, visual alignment. According to this method, markers for alignment are marked in advance on the optical waveguide element and near the V-grooves of the substrate by exact positioning. Then the element and the V-grooves are positioned relative to each other by observing these marks through a CCD, etc., and they are fixed with solder such as AuSu solder. As this method achieves a positioning precision of 1 $\mu$m or under rather easily, it is well on the way to being put to practical use in assembly of small-sized optical elements such as LD (laser diode) and PD (photo diode).

However, the application of this method to optical connection between an optical waveguide element, that uses a material having electrooptic effect or piezoelectric effect, such as LN, and optical fiber poses a problem. As the size of the optical waveguide element is large in general, and the optical waveguide element and the substrate of Si, etc. differ greatly in coefficient of thermal expansion, a large strain tends to be generated in the substrate during bonding or after bonding, that in turn prevents achievement of the desired alignment accuracy or generates cracks in joints of the substrate during the service.

SUMMARY OF THE INVENTION

The present invention is made in view of the above-mentioned problems of the prior art, and is intended to provide a structure for realizing passive alignment with high precision in an optical coupler that has an optical element that is to be optically coupled (optically connected) to an optical transmission line on a substrate, and a production method thereof. More specifically, it is intended to provide a structure that improves the alignment accuracy of the conventional visual alignment method and a production method thereof, and to provide a structure that improves the alignment accuracy of the conventional solder self-alignment.

The optical coupler according to the present invention is an optical coupler having a first substrate having a principal face with a groove for mounting an optical fiber and an optical element mounted on said principal face and to be optically coupled with the optical fiber, characterized in that
a base substrate, in coefficient of thermal expansion, being substantially identical to said optical element is jointed to another principal face of said first substrate, and that
said first substrate is divided into plural parts at the portion for mounting said optical element, and that said optical element is mounted on said plural parts at said portion. With this arrangement, any stresses and strains in the substrate after jointing are moderated to effectively control and prevent fluctuations in the positioning accuracy of the optical connection.

Preferably, said substrate is made of a single crystal of Si, and preferably, the difference in coefficient of thermal expansion between said substrate and said base substrate is kept within ±20%.

Preferably, on the principal face of the parts divided are provided trapezoidal protrusions provided with solder bumps and that melting temperatures of the solders of said solder bumps are varied from protrusions to protrusions.

The method of producing the optical coupler according to the present invention comprises:

providing a first mask for making a groove on one principal face of a single crystal substrate;

providing a second mask on another principal face of said substrate for patterning the portion for mounting an optical element into plural parts;

etching said two principal faces and dividing said substrate into said plural parts connected with each other by said first mask;

bonding said divided substrate onto a base substrate;

removing said first mask; and mounting and fixing the optical element on said plural parts. With this arrangement, the substrate can be divided directly, and the portion for mounting an optical element, that has been divided, can be bonded directly onto the base substrate without disturbing their formation.

Preferably, said single crystal substrate is a substrate of Si, said groove is a V-groove, and said etching is anisotropic etching.

The optical coupler according to the present invention is an optical coupler comprising: a first substrate having a principal face with a groove for mounting an optical fiber; and an optical element mounted on said principal face and to be optically coupled with the optical fiber, characterized in that the portion for mounting the optical element of said first substrate is provided with plural trapezoidal protrusions provided with solder bumps, and that melting temperatures of said solder bumps vary from protrusions to protrusions. Thus bonding between the substrate and the optical element can be effected stepwise by using the self-alignment effect of the solders; hence positioning can be made with high precision.

Further, preferably, the heights of said protrusions are varied from each other. As a result, during bonding of the substrate and the optical element, the optical element stepwise comes to contact with plural protrusions through solders. This further improves the positioning accuracy.

According to the present invention, with a construction wherein a base substrate, of which coefficient of thermal expansion is substantially identical to that of an optical element, is bonded onto the back of a substrate, and the substrate is provided with a portion for mounting an optical element, that is divided into plural parts, or with a construction wherein a portion for mounting an optical element on one principal face of a substrate is provided with plural trapezoidal protrusions on which solder bumps are formed, and the melting temperatures of the solders differ from protrusion to protrusion, the present invention has excellent effects that bonding of the substrate and the optical element to be mounted on the substrate can be done with high precision of positioning through simple steps using the self-alignment effect of solder, and that even if the substrate and the optical element differ in coefficient of thermal expansion, stresses and strains that are generated in the substrate during bonding and after bonding are moderated to effectively suppress and prevent fluctuations in the positioning accuracy of the optical connection, and in turn, to produce products of high reliability at lower cost.

Further, when an optical coupler, in which the portion for mounting an optical element of the substrate is divided into parts, is to be produced, through a step of providing a first mask for V-groove formation on one principal face of the substrate of Si, a step of providing a second mask for forming the portion for mounting an optical element that is to be divided on the other principal face of the substrate, a step of giving anisotropic etching to the two principal faces, next a step of bonding the substrate onto the base substrate, and a step of removing the first mask, the present invention has excellent effects that the substrate can be directly divided, without damaging the base substrate, to form the portion for mounting an optical element, and that the divided portion for mounting an optical element can be bonded onto the base substrate without disturbing the formation of the divided portion.

BRIEF DESCRIPTION OF THE DRAWINGS

FIG. 1 shows an optical coupler of an embodiment of the present invention,

FIG. 1 (*a*) is a plan view of the optical coupler P1, and

FIG. 1 (*b*) is a side view of it.

FIG. 2 shows the production steps of the optical coupler P1,

FIG. 2 (*a*) is a plan view of the optical coupler P1, and

FIG. 2 (*b*) is a side view of it.

FIG. 3 shows the production steps of the optical coupler P1,

FIG. 3 (*a*) is a plan view of the optical coupler P1, and

FIG. 3 (*b*) is a side view of it.

FIG. 4 shows the production steps of the optical coupler P1,

FIG. 4 (*a*) is a plan view of the optical coupler P1, and

FIG. 4 (*b*) is a side view of it.

FIG. 6 shows method of bonding the substrate and the optical element of the optical coupler P2, FIG. 6 (a) is a side view showing the state before bonding, FIG. 6 (b) is a side view at the time of rough alignment, and FIG. 6 (c) is a side view at the time of fine alignment.

EMBODIMENTS

Figures 1, 1B:
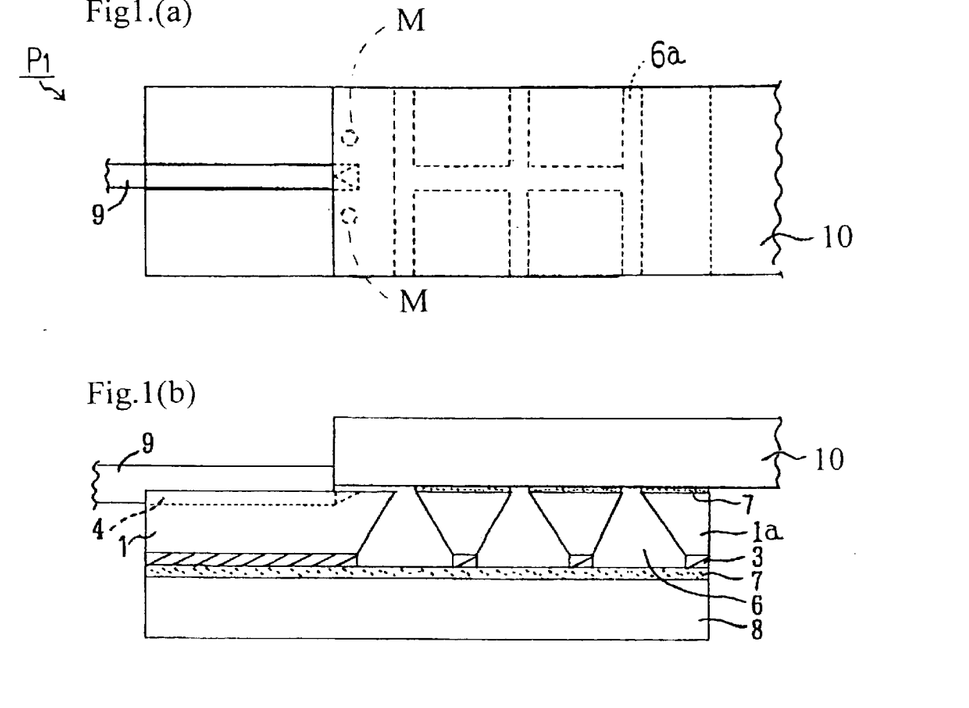
Figures 2A, 2B:
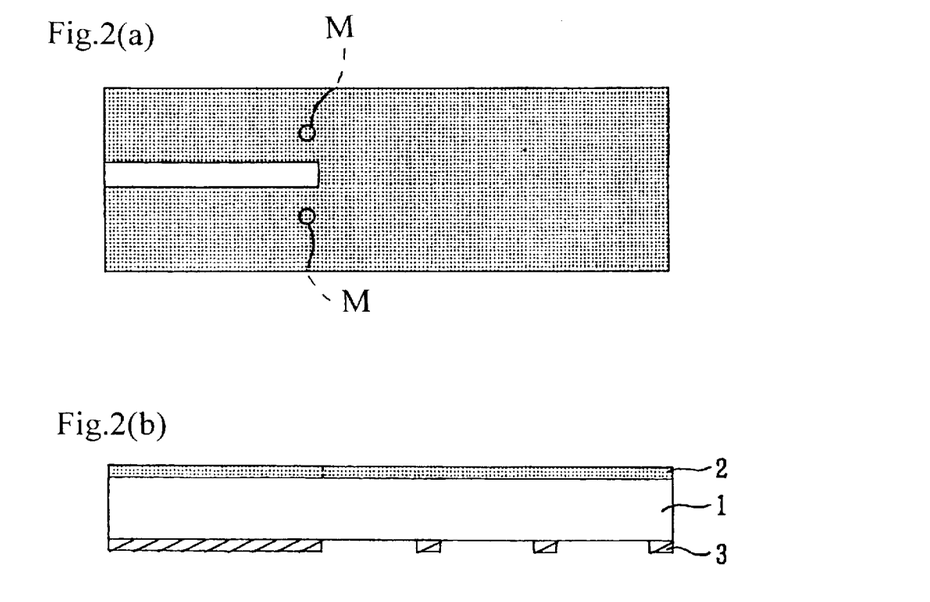
Figures 3A, 3B:
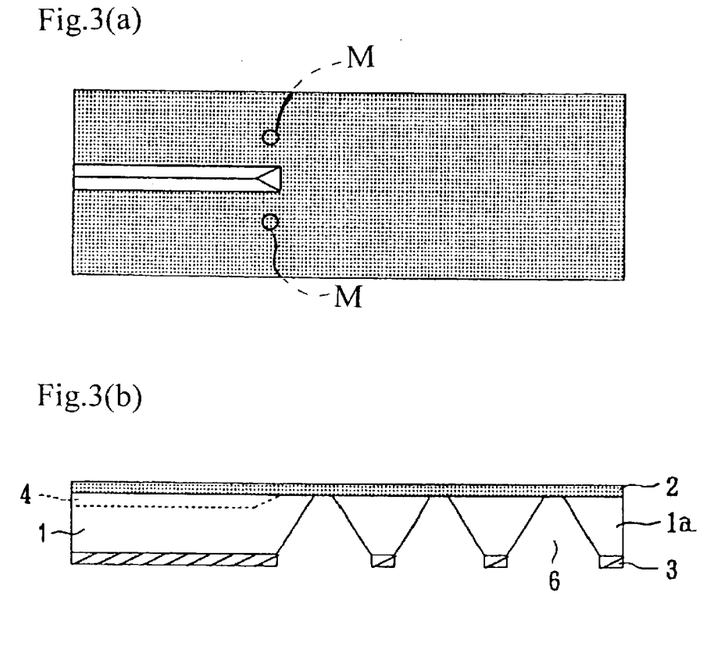
Figures 4, 4B:
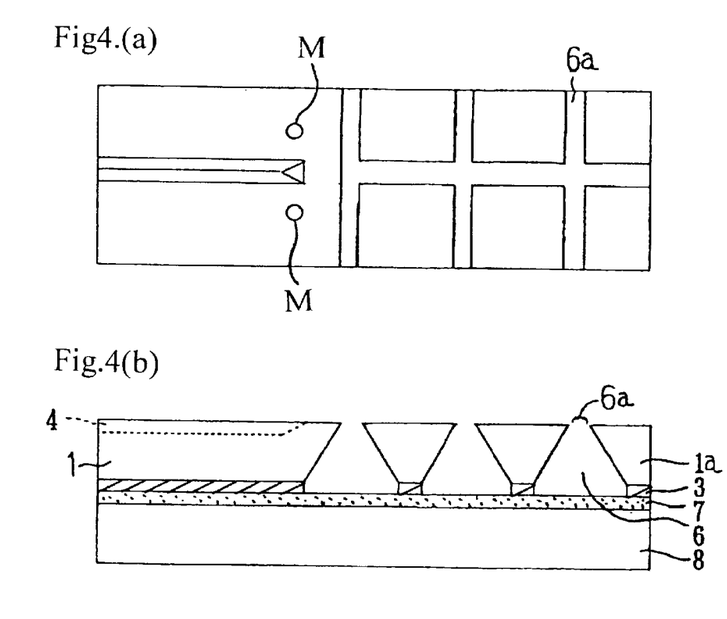
Figure 5:
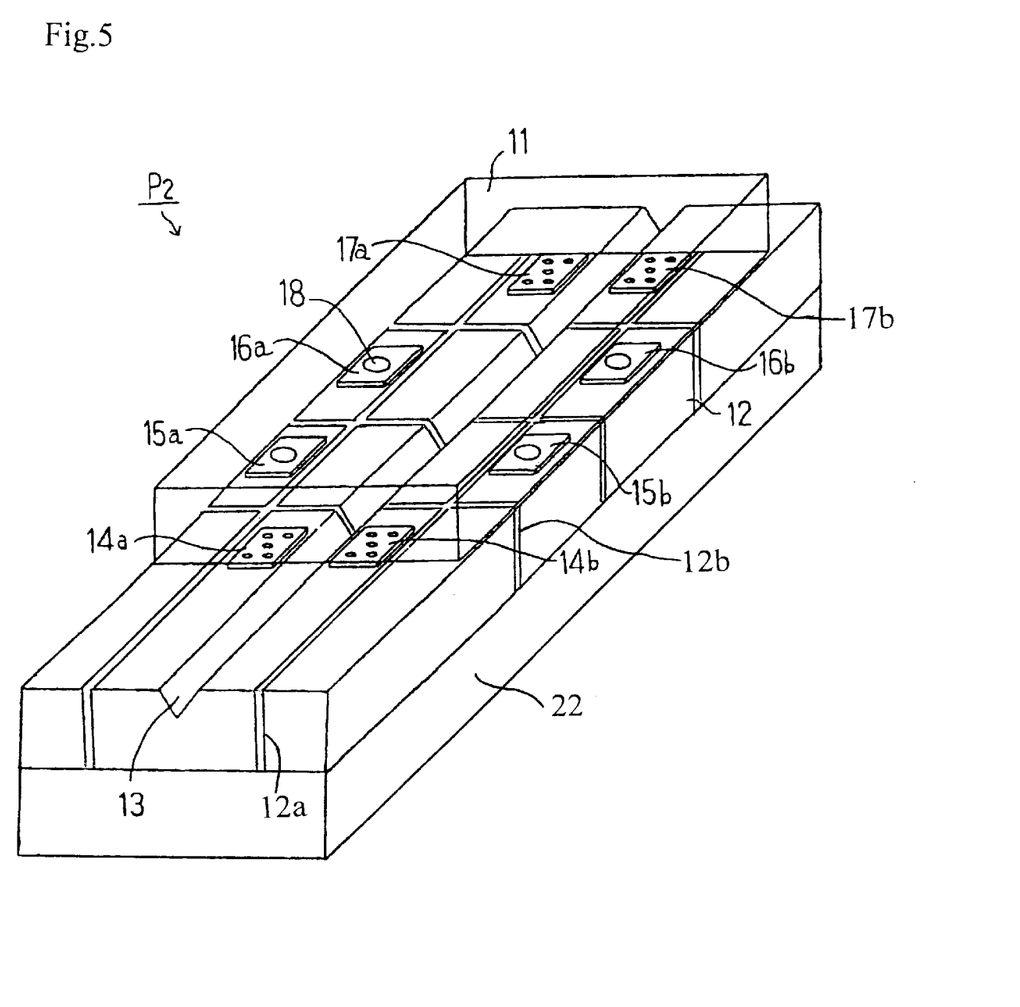
FIG. 5 is a perspective view of an optical coupler P2 according to an embodiment of the present invention.

Optical couplers of embodiments of the present invention will be described with reference to FIG. 1 through FIG. 6. FIG. 1 (a) is a plan view of an optical coupler P1, and FIG. 1 (b) is a side view of it. FIG. 2 through FIG. 4 show production steps of the optical coupler P1, and in each set of diagrams, (a) is a plan view of the optical coupler P1, and (b) is a side view of it. FIG. 5 is a perspective view of an optical coupler P2 of an embodiment, and FIGS. 6 (a) through (c) are side views illustrating the method of bonding a substrate and a optical element of the optical coupler P2 through the use of the self-alignment effect of solder.

In FIG. 1, 1 denotes a substrate, and in one of its principal faces is formed a V-groove 4 for mounting an optical fiber. 3 is a thin film of Cr/Au, that is provided on a surface of the block 1a to be bonded with a base substrate 8. The thin film 3 has a good wettability with solder. 4 is the V-groove for mounting an optical fiber. 6 is a gap that is present between blocks 1a that are formed by dividing the substrate 1 into plural parts. 6a is a slit that is formed above the gap 6. 7 is a solder such as Au/Sn solder. 8 is the base substrate. 9 is an optical fiber, and 10 is an optical element such as an LN optical waveguide element. M denotes a marker that is formed by, for example, a metal film. These markers are formed on both the lower face of the optical element 10 and the upper face of the substrate 1. Two markers that are formed on the optical element 10 and two markers that are formed on the substrate 1 are aligned with each other, by using a light beam that penetrates through the optical element, to make visual alignment.

In the embodiment, the material for the substrate 1 is selected from crystal materials such as Si that is suited to fine working, plastics, and ceramics that have excellent thermal conductivity. The single crystal of Si is particularly preferred. The base substrate 8 is designed to have a coefficient of thermal expansion that is substantially identical to that of the optical element 10. The difference between the two should be, for example, within 20%. If the material of the base substrate 8 is identical to that of the optical element 10, they have the same coefficient of thermal expansion, however, there is no need of using the same material. Preferred materials for the base substrate 8 include LN, single crystal of lithium tantalate (LT), single crystal of lithium tetraborate (LBO), crystals of oxides such as KH2PO4 (KDP), glasses such as BK7 glass (trade name of HOYA Ltd.) and quartz glass, and semiconductors of Si, GaAs, InP, etc. These materials are the same materials that are used for the optical element 10 being an optical waveguide element, semiconductor optical waveguide element or semiconductor light emitting element such as LD and LED, or these materials have coefficients of thermal expansion that are substantially identical to that of the optical element 10.

From the viewpoint of suppressing the fluctuations at the joint between the optical fiber 9 and the optical element 10, the coefficient of thermal expansion of the base substrate 8 may differ from that of the optical element 10 by about ±20%. In particular, it is desirable to set the coefficient of thermal expansion of the base substrate 8 at a value that is between the coefficient of thermal expansion of the optical element 10 and that of the substrate 1. With this arrangement, fluctuations in the joints due to a difference in coefficient of thermal expansion can be moderated effectively. It should be noted that when the coefficient of thermal expansion of the substrate 1 is A, if the coefficient of thermal expansion of the optical element is within a range of from 0.8A to 1.2A, their coefficients of thermal expansion are regarded as substantially identical ones.

The V-groove 4 is easily formed by anisotropic etching, etc., and the optical fiber 9 is stably mounted in the V-groove. The section of the groove may be concave, semi-circular, as well as V-shaped. The V-groove 4 may be formed by anisotropic etching with KOH, dry etching such as reactive ion etching, photolithography, mechanical cutting, etc.

The optical element 10 may be an optical waveguide element, semiconductor optical waveguide element, semiconductor light emitting element such as LD and LED, or semiconductor light receiving element such as PD. The optical element 10 may be provided with electrodes for signal input or with electrodes for inputting electric field, magnetic field, sound, elastic surface wave, etc. to modulate the light.

The blocks 1a of the optical coupler P1 can be formed from the substrate 1, like the V-groove 4, by anisotropic etching with KOH, etc.

The production method of the optical coupler P1 of the embodiment will be described through the following steps (1) through (6).

(1) A second mask 3 for forming blocks 1a is formed, as shown in FIG. 2, by lift-off on the other principal face (the back and the face opposite to the face in which the V-groove 4 is formed) of the substrate 1 of single crystal of Si. The material of the second mask 3 is Cr/Au thin film that can resist anisotropic etching. This Cr/Au thin film also serves to wet the solder 7 when the base substrate 8 and the substrate 1 are bonded with solder later. As for the accuracy of the mask pattern formation, about 10 μm is sufficient. Positional accuracy of this level can be achieved by simple alignment based on the orientation flat of the substrate 1. On the joint face between the block 1a and the base substrate 8, the width of the bottom of the block 1a in the longitudinal direction of the base substrate 8 is desired to be about 1 mm or less. This is to reduce any strains that may arise due to a difference in coefficient of thermal expansion between them. The reason is as follows:

The coefficient of thermal expansion of LN that is the material of the base substrate 8 is $15.4 \times 10^{-6}$ (axis a of crystal) and $7.5 \times 10^{-6}$ (axis c of crystal). The coefficient of thermal expansion of Si that is the material of the substrate 1 is $2.6 \times 10^{-6}$. When the base substrate 8 being ZcutLN measuring 2×50×1 mm and the substrate 1 being Si measuring 2×4×0.35 mm are bonded together with AuSn solder, etc., and the bonding area is about 2×2 mm wide and the reflow temperature is about 300° C., the resulting strain in the bonding plane is about 8 μm in both the directions of the X axis and the Y axis. The stresses working in the bonding plane will deform the substrate 1 or destroy the bonded surfaces. To prevent such deformation or breakage, the width of the block 1a in the longitudinal direction of the base substrate 1 is set at 1 mm or under, and preferably, the width of the block 1a in both the longitudinal and transverse directions is set at 1 mm or under.

(2) On one principal face (top) of the substrate 1, a film of a dielectric such as silicon nitride is formed as the first mask 2 that is for forming the V-groove 4 and also for etch stopping of the slit 6a. A pattern for forming the V-groove 4 is formed in the first mask 2 by etching. At this time, patterns for positioning the substrate 1 relative to the optical element 10 may be formed on the first mask 2.

(3) As shown in FIG. 3, with the first mask 2, both the top and the back of the substrate 1 are subjected to anisotropic etching to form the V-groove 4 on the top of the substrate 1 and gaps 6 on the back of the substrate 1, gaps 6 reaching the top side thereof. In this step, etching of the gaps 6 is stopped by the first mask 2 that is formed on the top, and the slit 6a are formed on the top side of the substrate 1.

In practice, anisotropic etching is done as follows. Anisotropic wet etching uses the fact that, when an alkaline etchant is used, the etch rate of the single crystal of Si depends significantly on the direction in the crystal. With this anisotropic wet etching, V-grooves and inverted trapezoidal grooves is formed on the surface of a substrate by precisely controlling the width and depth. Preferred alkaline etchants include KOH, NaOH, EPW (ethylenediamine+ pyrocatechol+water), hydrazine, and TMAH (tetra-methyl-ammonium hydroxide). The etch rate of these alkaline etchants for the crystal plane (100) or (110) of Si single crystal is about several ten times through several hundred times as large as the etch rate for the crystal plane (111). When the crystal planes of the substrate 1 are selected in such a way that the plane (111) for which the etch rate is small constitutes a side of the groove, fine working can be done with less undercut under the mask. In particular, the etch rate ratio of KOH is as large as several hundred times, and is most suited for fine working.

The crystal plane (100) is selected as the top of the substrate 1, and the edges of the mask opening are straight lines parallel to or perpendicular to the direction (011). Then the V-groove 4 and the gaps 6 are formed by anisotropic wet etching. Their sides are crystal planes (111) that incline at an angle of 54.74° with the top of the substrate 1. Accordingly, the mask pattern is correctly reflected in the sides of the V-groove 4, etc., and when an optical device such as an optical fiber is held by these sides, a positioning accuracy comparable to that of the mask will be achieved. The depth of the V-groove 4 that is formed in the top of the substrate 1 and the selection between the V-groove 4 and an inverted trapezoidal groove are controlled by the etching time.

The V-groove 4, etc. that are formed by such anisotropic wet etching have a positioning accuracy of, for example, ±0.5 μm or under. In FIG. 2 and FIG. 3, the markers M are covered by the first mask.

(4) As shown in FIG. 4, before bonding, a layer of solder 7, being a film of Au/Sn solder of about 3 μm thick, is formed on the face to be bonded of the base substrate 8 (ZcutLN substrate). The base substrate 8 is bonded onto the back of the substrate 1. It is bonded and fixed by reflow fixation, heating in an oven, or heating on a hot plate, then the first mask 2 is removed.

(5) A layer of solder 7 for bonding the optical element 10, being a film of AuSn solder of about 3 μm thick, is formed on the portion for mounting the optical element 10 on the top of the substrate 1 by the lift-off method. The steps up to this point are effected by the conventional wafer processes. The conformed substrate, comprising the substrate 1 and the base substrate 8, can be produced in a large quantity by dicing wafers.

Through the above-mentioned method, gaps 6 and slits 6a can be formed without damaging the bonding face of the base substrate 8. Furthermore, through a method just like one mentioned above, a part of the back of the substrate 1 may be etched to form a high frequency wave transmission line or the like, that uses the air layer between the substrate 1 and the base substrate 8.

(6) As shown in FIG. 1, the optical element 10 is mounted on the portion for mounting the optical element 10 on the substrate 1 in such a way that the optical waveguide edge (light emitting part or light receiving part) of the optical element 10 is optically connected to the optical fiber 9 that is to be mounted in the V-groove 4, then the solder 7 is heated and melted, and positional adjustment is made through the use of the self-alignment effect of the solder 7, and the optical element 10 is bonded onto the substrate 1. Next, the optical fiber 9 is mounted in the V-groove 4, and the light beam incident end or light beam emergence end of the optical fiber 9 is butted and fixed against the optical waveguide edge (light emitting part or light receiving part) of the optical element 10 to complete optical connection between the optical element 10 and the optical fiber 9. Jointing of the optical element 10 and the substrate 1 may be effected without using the self-alignment effect of the solder 7. It may be effected by the visual alignment method. However, the self-alignment method is preferred. In this case, any apparatus for position detection such as a CCD camera is not required.

In the embodiment, with regard to the formation and fixation of the blocks 1a, methods other than those mentioned above may be used. For example, the substrate 1 may be cut by the dicing method, etc., and blocks 1a may be bonded, one by one, onto the substrate 1. However, the method of the embodiment has excellent effects that blocks 1a can be directly formed from the substrate 1 and the blocks 1a can be bonded without disturbing the formation thereof. Bonding of the blocks 1a may be effected with an adhesive other than the solder 7.

Next, the optical coupler P2 shown in FIG. 5 will be described. In the diagram, 22 denotes a base substrate of LN, etc., and 11 is an optical element such as LN optical waveguide element. 12 is a substrate, a V-groove 13 for mounting an optical fiber is formed in one principal face of the substrate 12, and the substrate 12 is bonded onto the base substrate 22. 14a, 14b~17a, 17b are plural trapezoidal (terrace-like) convexes formed in the portion for mounting the optical element of the substrate 12. A solder bump 18 is formed on each of these convexes 14a, 14b~17a, 17b. Longitudinal slits 12a and transverse slits 12b are formed in the substrate 12 by dicing after jointing with the base substrate 22.

In this embodiment, the kinds of the optical element 11 and the materials of the substrate 12 are identical to those of the above-mentioned embodiment, and the method of forming the V-groove 12 is identical to that of the above-mentioned embodiment. The convexes 14a, 14b~17a, 17b are formed by forming a layer of an electric insulator such as SiO2 of about 10 μm thick on the substrate 12, and after the formation of the V-groove 13, etching said insulator layer to pieces of several hundred μm wide and about 10 μm thick. As mentioned above, it is preferable to use an insulator as the material for the convexes 14a, 14b~17a, 14b as mentioned above, and this prevents adverse effects on the electrodes, etc. of the optical element.

It is desirable to arrange the convexes 14a, 14b~17a, 17b symmetrically about an extension of the V-groove 13, and to space them at substantially regular intervals along the extension of the V-groove 13. The convexes are also arranged in the periphery of the connecting face of the optical element 11 and an optical fiber not illustrated and near the V-groove 13. Or they may be arranged to pinch the V-groove 13 in between. With such an arrangement, satisfactory bonding strength and positioning accuracy can be obtained. In FIG. 5, the V-groove 13 extends up to the bonding face. However, the V-groove 13 may not be present in the bonding face.

In the embodiment, for example, it is desirable to make the heights (thicknesses) of the convexes 14a, 14b, 17a, 17b that are arranged in the periphery of the connecting face and near the V-groove 13, namely, the light incident/emergence end and the opposite end higher (thicker) than the heights (thicknesses) of the convexes 15a, 15b, 16a, 16b that are arranged in the intermediate area of the joint. It is also desirable to make the melting temperature TL of the solders that are formed on the convexes 15a, 15b, 16a, 16b of lower height lower than the melting temperature TH of the solders that are formed on the convexes 14a, 14b, 17a, 17b of the higher height.

With the above-mentioned construction, the substrate 12 and the optical element 11 are bonded together while their relative positions are adjusted stepwise. FIG. 6 shows its bonding method. On a face of the optical element 11 that is to be bonded to the substrate 12, metal films (including alloy films) 24b~27b, such as Al thin film and Cr/Au thin film that have good wettability with solder, are provided in positions corresponding to the convexes 14a, 14b~17a, 17b. In FIG. 6, one can not see the convexes 14a, 15a, 16a, 17a. Hence only metal films 24b, 25b, 26b, 27b, that correspond to the convexes 14b, 15b, 16b, 17b, are illustrated.

Figure 6A:
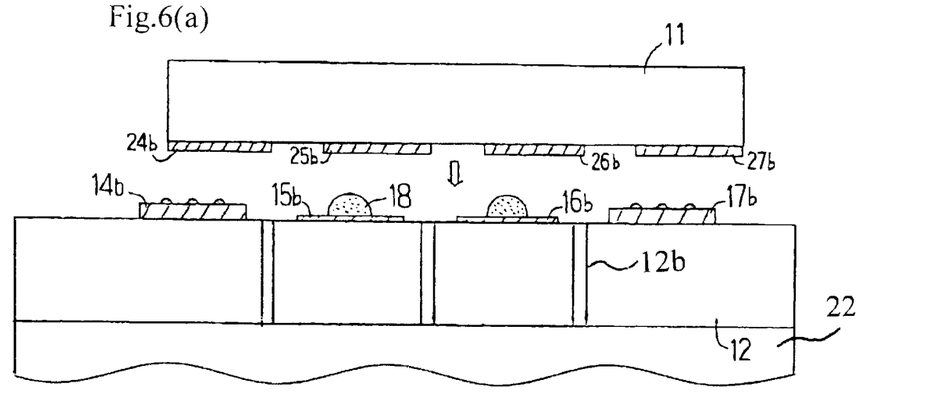

FIG. 6 (a) shows the state before bonding. The optical element 11 is placed on the substrate 12, but the position of the optical element 11 is slightly off the point.

Figure 6B:
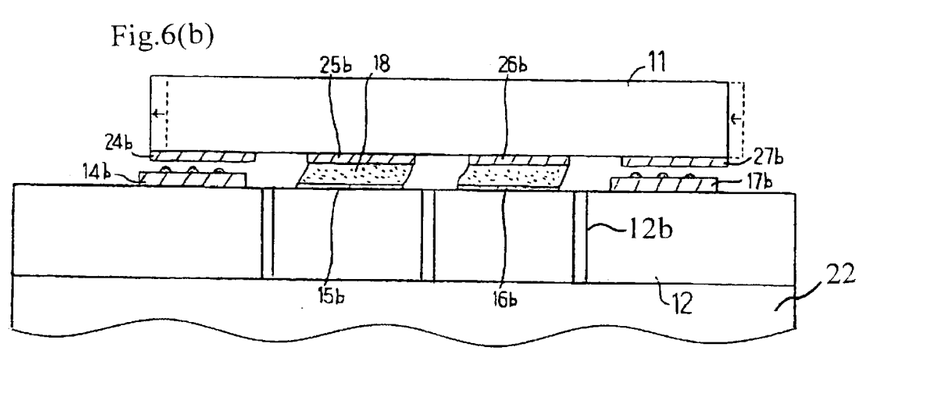

Next, as shown in FIG. 6 (b), the optical element 11 is placed on the substrate 12 and the assembly is heated. The metal films 25a, 25b, 26a, 26b contact the solder bumps 18 on the convexes 15a, 15b, 16a, 16b. When the temperature reaches TL, the solders on the convexes 15a, 15b, 16a, 16b will melt first. At the same time, due to the self-alignment effect of the solders, the optical element 11 will be shifted horizontally and restored to its proper position; thus rough alignment is made. This is because the solder bumps 18 on the convexes 15a, 15b, 16a, 16b are larger, and their restoring forces are greater than those of smaller solder bumps but their positioning accuracy is inferior.

The above-mentioned heating and solidification of the solders can be effected by well-known methods such as heating in an oven, beating on a hot plate, and reflow fixation.

Figure 6C:
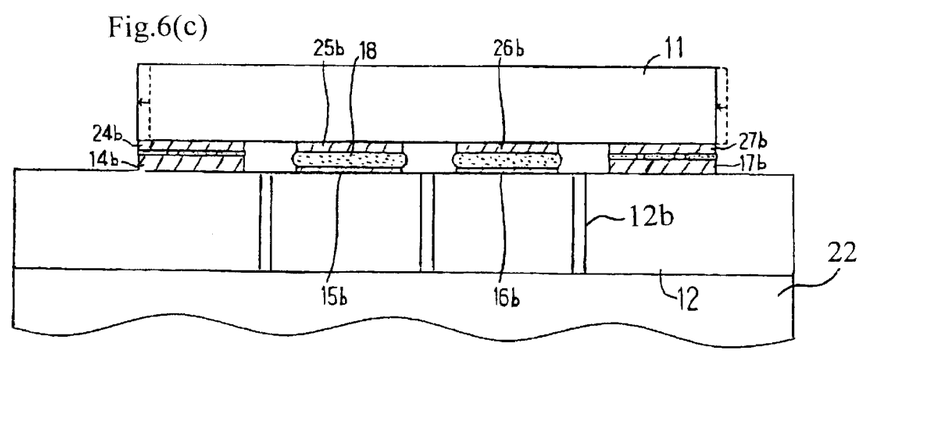

Next, when heating is continued, the optical element 11 will gradually descend of its own weight, and the metal films 24a, 24b, 27a, 27b will contact the solder bumps 18 on the convexes 14a, 14b, 17a, 17b. When the temperature reaches TH, as shown in FIG. 6 (c), the solders on the convexes 14a, 14b, 17a, 17b will be melted. At this time, due to the self-alignment effect of the solders, fine alignment in the horizontal direction and fine adjustment in the direction of height is effected. This is because the solder bumps 18 on the convexes 14a, 14b, 17a, 17b are small, and their restoring forces are small but the resulting positioning accuracy is high.

Thus satisfactory positioning accuracy and bonding strength are obtained through the self-alignment process in two stages. In FIG. 6, positioning in one direction is illustrated, but positioning can be made two-dimensionally in a plane.

In the embodiment, it is desirable to keep the difference in melting temperature of solder within a range of from about 0.1° C. to about 10° C. If the difference is less than 0.1° C., all the solders will melt quickly one after another, making it hard to have a proper interval; thus it will be difficult to effect stepwise adjustment. On the other hand, if the difference is greater than 10° C., said interval will get longer, and new displacement may be caused by external vibration, etc., or the solders that melt first may solidify before the next solders melt; it tends to make adjustment impracticable.

It is desirable to provide plural roughly semispherical solder bumps 18, of which diameters ranging from about 5 $\mu$m to about 20 $\mu$m, on the convexes 14a, 14b, 17a, 17b. If their diameters are less than 5 $\mu$m, their restoring forces for shifting the optical element 11, due to the self-aligning effect of the solders, tend to be deficient. If their diameters exceed 20 $\mu$m, the shift of the optical element 11 will be greater, and the accuracy of fine alignment will deteriorate. As for the convexes 15a, 15b, 16a, 16b, it is desirable to keep the diameters of their bumps in a range of from about 100 $\mu$m to about 200 $\mu$m. If the diameters are less than 100 $\mu$m, the shift of the optical element 11 due to the self-alignment effect of the solders will be small and it will be hard to make rough alignment, and if the diameters exceed 200 $\mu$m, the shift of the optical element 11 will be large, and the accuracy of rough alignment will deteriorate.

The difference in height of the convexes 14a, 14b~17a, 17b corresponds to the diameter of the solder bumps 18 on the convexes 15a, 15b, 16a, 16b, and it is desirable to keep the difference a little smaller than that diameter or within a range of from about 50 $\mu$m to about 100 $\mu$m. If the difference in height is less than 50 $\mu$m, the shift of the optical element 11 due to the self-alignment effect of the solder is small and it is difficult to make alignment. If the difference exceeds 100 $\mu$m, the shift of the optical element 11 will get larger and the accuracy of alignment will deteriorate.

Thus in the present embodiment, bonding of the substrate and the optical element that is to be mounted on the substrate is effected by simple steps, that use the self-alignment effect of solders, with high positioning accuracy, and even when the substrate and the optical element differ in coefficient of thermal expansion from each other, stresses and strains, that are generated in the substrate during bonding and after bonding of the substrate and the optical element, are moderated to effectively prevent fluctuations of the positioning accuracy of the optical connection.

In the application of the embodiment of FIG. 5, slits 12b, etc. may be omitted. The present invention is not limited to the respective embodiments, and various modifications can be made within a range that does not deviate from the gist of the present invention.

What is claimed is:

1. An optical coupler comprising: a first substrate having a first principal face with a groove for mounting an optical fiber; an optical element mounted on said first principal face and to be optically coupled with the optical fiber; and a base substrate having a coefficient of thermal expansion substantially identical to that of said optical element jointed to a second principal face of said first substrate, wherein said first substrate is divided into plural parts at a portion of mounting said optical element, and wherein said optical element is mounted on said plural parts at said portion.

2. An optical coupler of claim 1 wherein said first substrate is made of a single crystal of Si.

3. An optical coupler of claim 1 wherein a difference in coefficient of thermal expansion between said first substrate and said base substrate is within ±20% of each other.

4. An optical coupler of claim 1 wherein the plural parts of the first substrate are trapezoidal in cross-sectional shape, the optical coupler further comprising solder bumps formed on the second principal face over the plural parts, wherein the solder bumps formed over different ones of the plural parts have different melting temperature.

5. An optical coupler of claim 1, wherein the plural parts of the first substrate are divided by crossing slits and are arranged in a matrix form, each part having a flat surface.

6. An optical coupler of claim 5, further comprising protrusions formed over each of the plural parts of the first substrate, wherein the solder bumps are formed on the protrusions, wherein parts located at a peripheral of the matrix have higher protrusions and higher melting temperature of the solder bumps than parts located at a center of the matrix.

7. A method of producing an optical coupler comprising:

providing a first mask for making a groove on a first principal face of a single crystal substrate;

providing a second mask on a second principal face of said substrate for patterning a portion of the substrate into plural parts;

etching said first and second principal faces to divide said substrate into said plural parts connected with each other by said first mask;

bonding said divided substrate onto a base substrate at the second principal face;

removing said first mask; and mounting and fixing an optical element on said plural parts on the first principal face.

8. A method of producing an optical coupler of claim 7 wherein said single crystal substrate is an substrate of Si, said groove is a V-groove, and said etching is anisotropic etching.

9. An optical coupler comprising:

a substrate having a principal face with a groove for mounting an optical fiber, a portion of the principal face being divided by gaps to form plural parts having trapezoidal cross-sectional shapes; and solder bumps formed on the principal face of the substrate on plural parts for mounting an optical element, the solder bumps formed over different ones of the plural parts having different melting temperature.

* * * * *